(12) United States Patent
Butzberger et al.

(10) Patent No.: US 7,324,945 B2
(45) Date of Patent: Jan. 29, 2008

(54) METHOD OF DYNAMICALLY ALTERING GRAMMARS IN A MEMORY EFFICIENT SPEECH RECOGNITION SYSTEM

(75) Inventors: John W. Butzberger, Menlo Park, CA (US); Horacio E. Franco, Menlo Park, CA (US); Leonardo Neumeyer, Palo Alto, CA (US); Jing Zheng, Redwood city, CA (US)

(73) Assignee: SRI International, Menlo Park, CA (US)

( * ) Notice: Subject to any disclaimer, the term of this patent is extended or adjusted under 35 U.S.C. 154(b) by 836 days.

(21) Appl. No.: 09/894,898

(22) Filed: Jun. 28, 2001

(65) Prior Publication Data

US 2003/0004722 A1   Jan. 2, 2003

(51) Int. Cl.
*G10L 15/18* (2006.01)

(52) U.S. Cl. .................................. 704/270.1; 704/257

(58) Field of Classification Search ................. 704/257, 704/3, 7, 270.1, 235, 9, 2, 8; 711/100
See application file for complete search history.

(56) References Cited

U.S. PATENT DOCUMENTS

| | | | |
|---|---|---|---|
| 5,699,456 A | | 12/1997 | Brown et al. |
| 5,719,997 A | * | 2/1998 | Brown et al. ................ 704/257 |
| 5,758,319 A | * | 5/1998 | Knittle ........................ 704/251 |
| 5,805,772 A | * | 9/1998 | Chou et al. .................. 704/255 |
| 5,907,634 A | * | 5/1999 | Brown et al. ................ 382/226 |
| 5,915,001 A | * | 6/1999 | Uppaluru ................ 379/88.22 |
| 5,937,384 A | * | 8/1999 | Huang et al. ................ 704/256 |
| 6,006,181 A | * | 12/1999 | Buhrke et al. .............. 704/231 |
| 6,408,272 B1 | * | 6/2002 | White et al. .............. 704/270.1 |
| 6,424,945 B1 | * | 7/2002 | Sorsa ...................... 704/270.1 |
| 6,665,640 B1 | * | 12/2003 | Bennett et al. ............. 704/257 |
| 2002/0032564 A1 | * | 3/2002 | Ehsani et al. ............... 704/235 |
| 2002/0143551 A1 | * | 10/2002 | Sharma et al. ........... 704/270.1 |

OTHER PUBLICATIONS

S.J. Young, et al., "Token Passing: A Simple Conceptual Model for Connected Speech Recognition Systems", Cambridge University Engineering Department, Jul. 31, 1989, pp. 1-23.
X.D. Huang, J. Ariki, M.A. Jack, "Hidden Markov Models for Speech Recognition", Edinburgh University Press, 1990, chapter 2.

* cited by examiner

*Primary Examiner*—Abul K. Azad
(74) *Attorney, Agent, or Firm*—Kin-Wah Tong, Esq.; Patterson & Sheridan, LLP (57) ABSTRACT

A method of speech recognition that uses hierarchical data structures that include a top level grammar and various related subgrammars, such as word, phone, and state subgrammars. A speech signal is acquired, and a probabilistic search is performed using the speech signal as an input, and using the (unexpanded) grammars and subgrammars as possible inputs. Memory is allocated to a subgrammar when a transition to that subgrammar is made during the probabilistic search. The subgrammar may then be expanded and evaluated, and the probability of a match between the speech signal and an element of the subgrammar for which memory has been allocated may be computed. Because unexpanded grammars and subgrammars take up very little memory, this method enables systems to recognize and process a larger vocabulary that would otherwise be possible. This method also permits grammars and subgrammars to be added, deleted, or selected by a remote computer while the speech recognition system is operating, allowing speech recognition systems to have a nearly unlimited vocabulary.

35 Claims, 5 Drawing Sheets

METHOD OF DYNAMICALLY ALTERING GRAMMARS IN A MEMORY EFFICIENT SPEECH RECOGNITION SYSTEM

BACKGROUND OF THE INVENTION

1. Field of the Invention

The invention relates generally to speech recognition and, more specifically, to memory allocation in speech recognition systems to facilitate the use of dynamically alterable grammars.

2. Description of the Related Art

Many different speech recognition products have become commercially available recently. These products range from powerful dictation software that runs on personal computers, to much simpler systems that can recognize only a few words or commands. Most of these products use well-known speech recognition techniques and algorithms in which a speech signal is first sampled, and certain features or characteristics of the sampled signal are measured.

The English language is usually modeled as consisting of about 40 different sounds called phonemes, or phones. After a speech signal has been sampled and measured, a decoder (such as a Viterbi decoder or a Stack decoder) is typically used to match the measurements with the most likely phonemes. A "dictionary" is then used to combine the phonemes into words.

The words included in a speech recognition system's dictionary may be derived from data structures called "grammars" and "subgrammars." For example, a "days of the week" grammar might include the words Monday, Tuesday, Wednesday, Thursday, Friday, Saturday, and Sunday. Each word in a grammar is in turn commonly represented as the sequence of phonemes corresponding to the word's dictionary pronunciation. For example, one pronunciation of the word "Monday" might be represented by the five phonemes /m/, /ah/, /n/, /d/, and /ey/. Each phoneme is in turn typically represented by a three state Hidden Markov Model (HMM).

The quality of speech recognition systems has improved dramatically over the past several years; however, these systems usually require a significant amount of computer memory and processing power. Although this may not be a problem where powerful personal computers are used for speech recognition, it does limit the capabilities of speech recognition systems used in portable devices, which are currently only able to recognize a few words or commands.

Speech recognition systems require so much memory in part because of the way that the various grammars and subgrammars—the words, phones, and states—are stored and searched during operation of the system. These systems typically compile, expand, flatten, and optimize all of the grammars used by the speech recognition system into a large, single level data structure that must be stored in memory before the speech recognition system can operate. The generation of a large, single level data structure before run-time may allow certain types of speech recognition systems (such as systems used for dictation) to operate more quickly; however, this technique prevents grammars and subgrammars from being added to a speech recognition system at run-time.

Accordingly, there remains a need in the art for speech recognition system that uses memory efficiently, and that allows grammars and subgrammars to be dynamically alterable, i.e., added or replaced while the system is operating.

SUMMARY OF THE INVENTION

A method of speech recognition that uses hierarchical data structures that include a top level grammar and various related subgrammars, such as word, phone, and state subgrammars. Unlike typical speech recognition systems, these grammars and subgrammars are not compiled, expanded and flattened into a single large data structure before run-time. Instead, a speech signal is acquired, and a search is performed using the speech signal as an input, and using the (unexpanded) grammars and subgrammars as possible inputs. Memory is allocated to a subgrammar when a transition to that subgrammar is made during the search. The subgrammar may then be expanded and evaluated, and the probability of a match between the speech signal and an element of the subgrammar for which memory has been allocated may be computed.

Because unexpanded grammars and subgrammars take up very little memory, this method enables systems with limited amounts of memory to recognize and process a larger vocabulary that would not otherwise be possible. This technique also permits grammars and subgrammars to be added, deleted, or selected (such as by a remote computer) while the speech recognition system is operating, allowing speech recognition systems to have a nearly unlimited vocabulary.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

DETAILED DESCRIPTION OF THE PREFERRED EMBODIMENT

Figure 1:
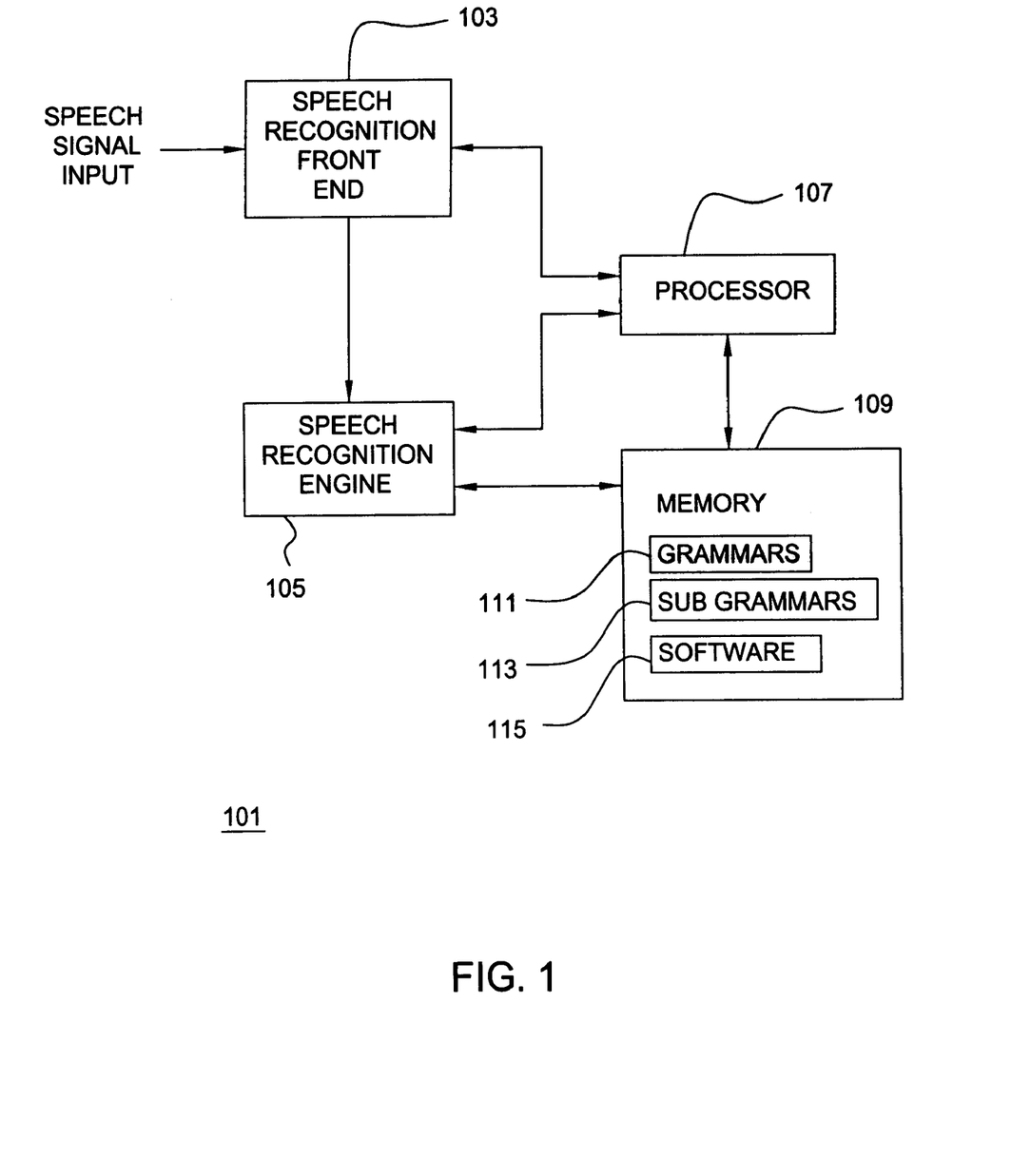
FIG. 1 is a block diagram of an illustrative speech recognition system that operates in accordance with the present invention.

FIG. 1 is a block diagram illustrating a preferred speech recognition system 101. This system 101 may be implemented in a portable device such as a hand held computer, a portable phone, or an automobile. It may also be implemented in a stationary device such as a desktop personal computer or an appliance. The speech recognition system 101 illustratively comprises a speech recognition front end 103, a speech recognition engine 105, a processor 107, and a memory 109.

The speech recognition front end 103 receives and samples spoken input, and then measures and extracts features or characteristics of the spoken input that are used later in the speech recognition process. The speech recognition engine 105 includes a search algorithm (such as a Viterbi search algorithm) and acoustic models (such as models of individual phonemes or models of groups of phonemes) used in the speech recognition process. The processor 107 and associated memory 109 together operate as a computer to control the operation of the front end 103 and the speech recognition engine 105. The memory 109 stores the grammars 111 and subgrammars 113 that are used by the system 101 to process speech. Memory 109 also stores the software 115 that is used to implement the methods of the present invention. Both the speech recognition front end 103 and the speech recognition engine 105 may be implemented in hardware, software, or combination of hardware and software. Both may also use any techniques or algorithms known to those skilled in the art for performing speech recognition. All of the elements 103-109 may communicate with each other as required.

In a preferred embodiment, the grammars 111 and subgrammars 113 used by the speech recognition system 101 may be written by a programmer in a compact form, such as the Backus-Naur Form (BNF). For example, a top-level grammar that includes four words might be written as:

Word subgrammar ::=<word 1> <word 2> <word 3> <word 4>

If "word 1" is a word that includes three phonemes, than a phoneme subgrammar associated with word 1 might be written as:

(Word 1) phoneme subgrammar ::=<phoneme 1> <phoneme 2> <phoneme 3>

Similarly, if "phoneme 1" can be represented as a three-state Hidden Markov Model, then a state subgrammar associated with phoneme 1 might be written as:

(Phoneme 1) state subgrammar ::=<state 1> <state 2> <state 3>

The grammar and its related subgrammars may then be converted from the Backus-Naur form shown above to compact data structures that hierarchically link the grammar and the various subgrammars. For example, "word 1" in the word subgrammar would have a link to its associated phoneme subgrammar; similarly, "phoneme 1" in the word 1 phoneme subgrammar would have a link to its associated state subgrammar. Each element in a subgrammar would also be linked to other elements in that subgrammar by element-to-element transition probabilities. That is, each word in a word subgrammar would be linked to other words in that subgrammar by word-to-word transition probabilities; each phoneme in a phoneme subgrammar would be linked to other phonemes in that subgrammar by phoneme-to-phoneme into transition probabilities; and finally, each state in a state subgrammar would be linked to other states in that subgrammar by state-to-state transition probabilities.

Figure 2:
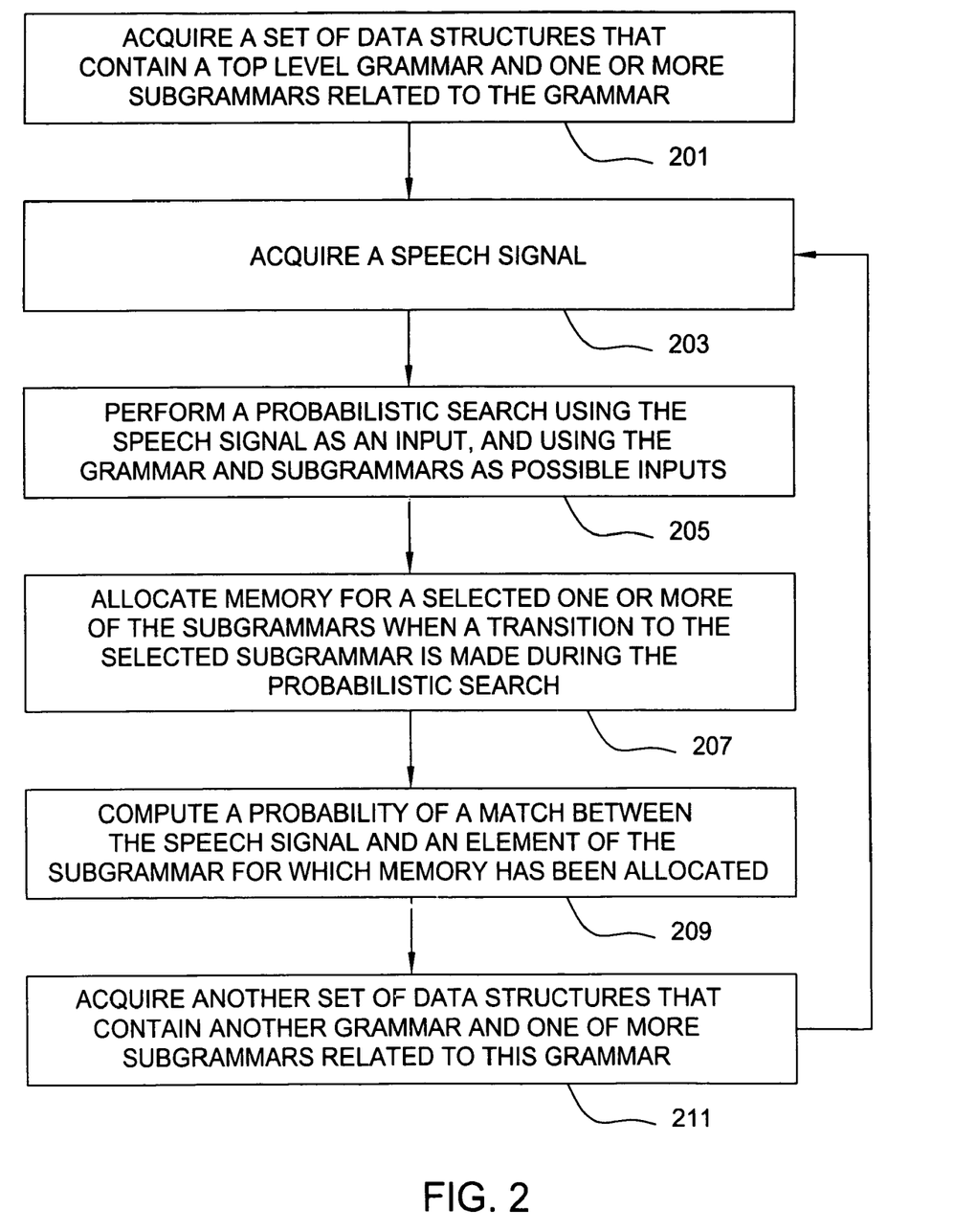
FIG. 2 is a flow chart illustrating a method for allocating memory in a speech recognition system.

FIG. 2 is a flowchart illustrating a method, implemented as software 115 and executed by the processor 107, for allocating memory in the speech recognition system 101. In this method, the speech recognition system 101 acquires a set of data structures that contain a top level grammar 111 and one or more subgrammars 113 related to the grammar (step 201). The top level grammar would typically be a word grammar or a higher-level grammar that includes one or more word subgrammars. The top-level grammar and the subgrammars are preferably hierarchically related as discussed above.

Next, the speech recognition system acquires a speech signal (step 203). The speech signal may be a sampled, subsampled, filtered or modified speech signal as is typically required by speech recognition systems, and may be acquired and processed using a speech recognition front end as discussed above regarding FIG. 1.

A probabilistic search is then performed using a speech signal as an input and using the grammar and subgrammar data structures as possible inputs (step 205). This step may be performed with a speech recognition engine 105 of FIG. 1 or with a general-purpose processor that uses any desired probabilistic search algorithm. In a preferred embodiment, a Viterbi beam search is used.

The speech recognition system 101 is configured such that the probabilistic search algorithm has an expectation of what the spoken input might be. For example, a speech recognition system might be used to supply flight arrival information. In response to a request for a flight number, the system would expect the speaker to say a number, not a day of the week or city name. In this way, the probabilistic search algorithm will have made a "transition" to a grammar or subgrammar of flight numbers. The system would then allocate memory to expand the grammar or subgrammar (step 207) so that a probability of a match can be calculated between a speech signal and one or more elements of the subgrammar for which memory has been allocated (step 209). While the system is operating, the system could then obtain another set of data structures that contain another grammar and one or more subgrammars related to the grammar (step 211). Steps 203-209 could then be repeated. Of course, if memory has already been allocated for a desired grammar or subgrammar, there would be no need to allocate additional memory and step 207 may be skipped.

Figure 3:
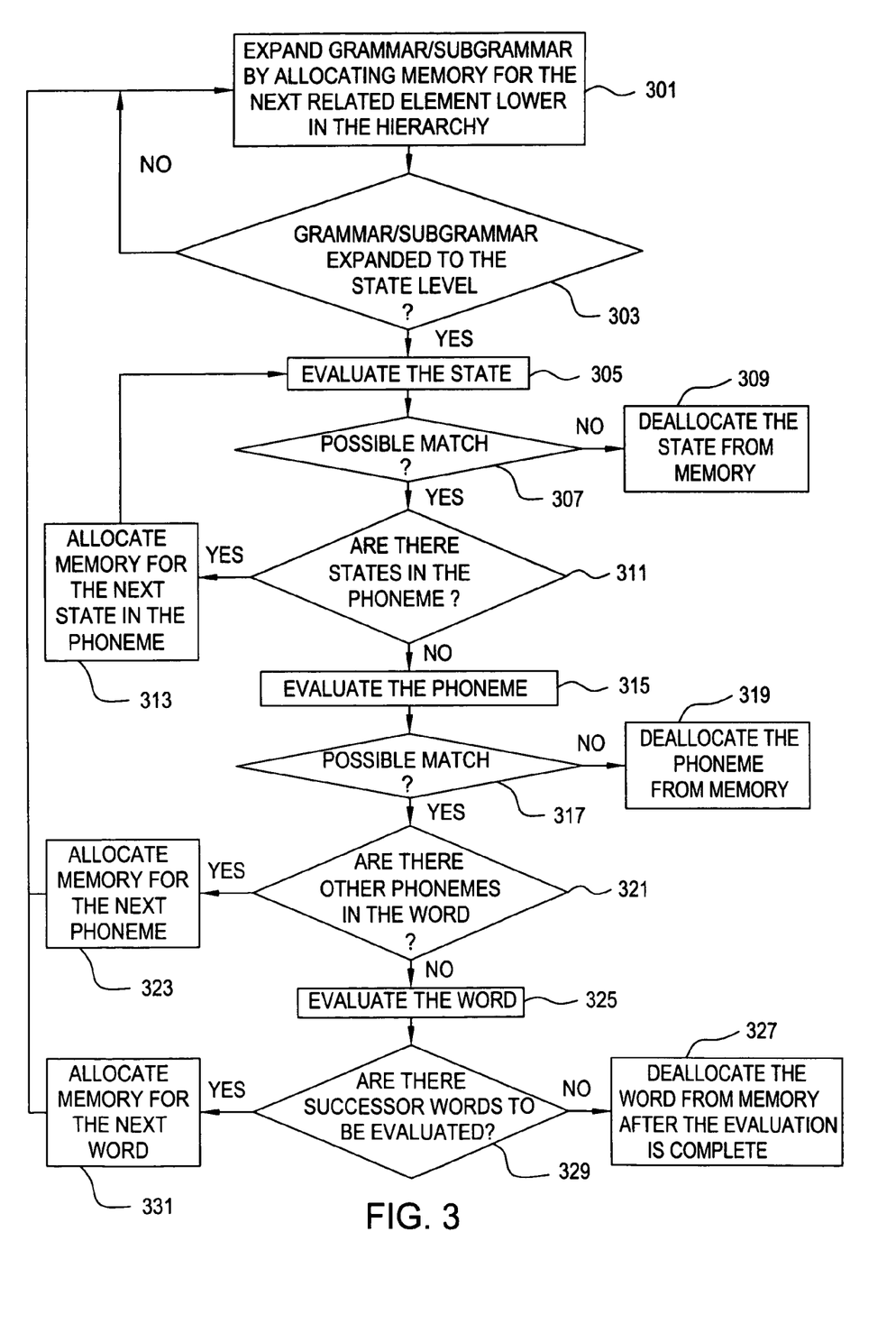
FIG. 3 is a flow chart illustrating a method for expanding and evaluating grammars and subgrammars in a speech recognition system.

FIG. 3 is a flow chart illustrating a method for expanding and evaluating grammars and subgrammers.

A grammar or a subgrammar is expanded by allocating memory for related elements that are lower in the hierarchy until the state level is reached (steps 304 and 303). For example, when a word is allocated in memory, an initial phoneme for the word and an initial state for the initial phoneme are allocated in memory. The state is then evaluated by comparing the state with information obtained from the speech signal (step 305). If there is a possible match (step 307) and there are other states in the phoneme (step 311), memory is allocated for the next state in the phoneme (step 313), and that next state is then evaluated (step 305). If there is no possible match between the state and information obtained from the speech signal, the state may be removed or de-allocated from memory (step 309). A dynamically adjustable, threshold may be used to determine the probability of a state match.

If there are no other states in a phoneme, the phoneme itself is evaluated. If there is a possible match between the phoneme and information contained in the speech signal (step 317) and there are other phonemes in the word (step 321), memory is allocated for the next phoneme (step 323). Steps 301-315 are then repeated for the next phoneme. If there is no possible match between the phoneme and information obtained from the speech signal, the phoneme may be removed or de-allocated from memory (step 319). A dynamically adjustable threshold may be used to determine the probability of a phoneme match.

If there are no other phonemes in the word, the word itself is evaluated (step 325). If there are successor words to be evaluated (step 329), memory is allocated for the next word (step 331), and steps 301-325 are then repeated for that word. If there are no successor words to be evaluated, the evaluation is complete and the word or words are deallocated from memory (step 327). A word may also be deallocated from memory when there is no possible match between the word and the received speech signal. A dynamically adjustable threshold may be used to determine the probability of a word match.

Because the preferred grammars and subgrammars do not need to be expanded and flattened into a single large data structure before run-time, grammars and subgrammars can be added, deleted, or replaced while the speech recognition system is operating. In one embodiment of the invention shown in FIG. 4, a remote server or computer 401 could be used to supply new grammars to a speech recognition device 403 via a communications link 405 whenever required the link 405 may be wired, wireless or some form of network data distribution link. Server 401 could also be used to select grammars that are already loaded onto the speech recognition device 403. The speech recognition device 403 could be a portable device such as a phone, automobile, or handheld computer; it could also be a stationary device such as a desktop computer or appliance.

Figure 4:
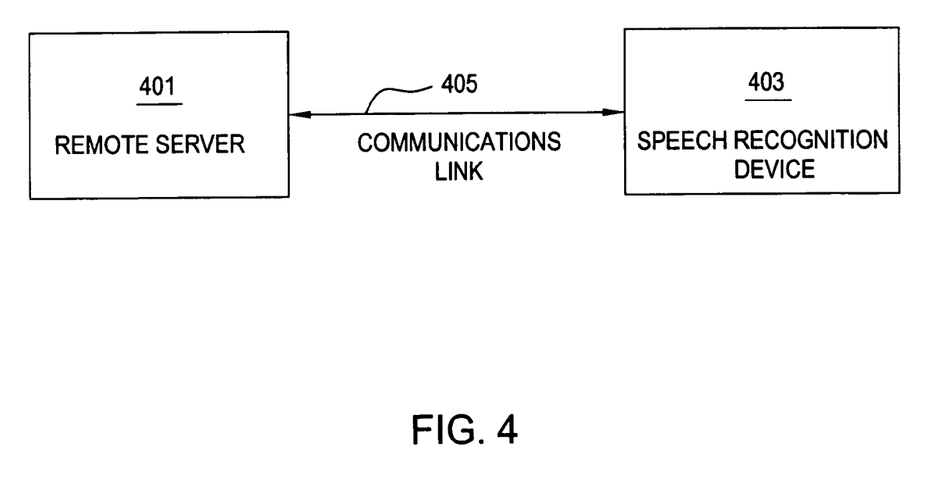
FIG. 4 shows a communications link between a speech recognition device and a remote computer or server.

The device 403 would operate in accordance with the method of FIG. 3 to reallocate memory as grammars and subgrammars are received from the server 401.

Figure 5:
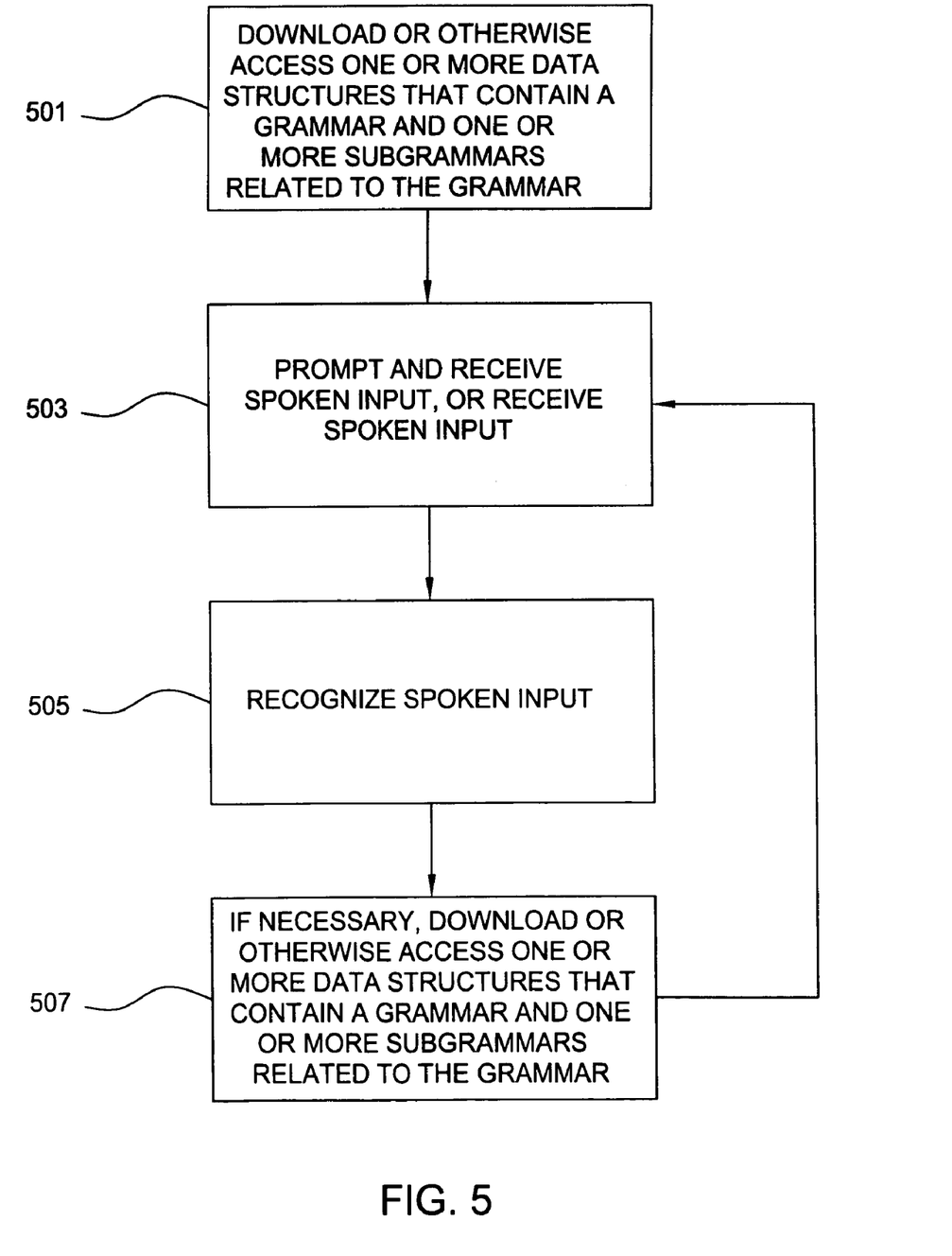
FIG. 5 is a flow chart illustrating a method for downloading or otherwise accessing grammars and subgrammars while a speech recognition system is operating.

FIG. 5 is a flow chart illustrating a method of downloading grammars and subgrammars. This ability of a speech recognition device (such as device 403 in FIG. 4) to add and delete grammars at run-time may be useful in a prompt and response system in which a person is asked to make a series of choices, or with a browser application that allows a person to make choices or selections by speaking. For example, a prompt and response system or an Internet browser could be used to help a person find a restaurant. In such systems or applications, data structures that contain a grammar and one or more subgrammars related to the grammar are first downloaded to or otherwise accessed by a speech recognition device (step 501 of FIG. 5). The data structures might be included in the code that defines a particular web page, or they might otherwise be associated with one or more web pages.

In the example discussed above, the downloaded data structures might include a grammar that includes a list of restaurant types, such as fast food, pizza, Mexican food, Chinese food, etc. These various choices might then be presented to a person audibly (through a speaker), visually (on a screen), or both audibly and visually. The speech recognition device would then receive spoken input from the person; for example, the person might say the word "pizza" (step 503). The device would then recognize the spoken input (step 505), and if necessary another set of data structures would be downloaded or otherwise accessed (step 507). For example, the device might download a grammar that includes a list of all of the pizza restaurants in the area. Steps 503-507 could then be repeated as necessary.

While foregoing is directed to the preferred embodiment of the present invention, other and further embodiments of the invention may be devised without departing from the basic scope thereof, and the scope thereof is determined by the claims that follow.

The invention claimed is:

1. A method for allocating memory in a speech recognition system comprising the steps of:
   acquiring a first set of data structures that contain a grammar, a word subgrammar, a phone subgrammar and a state subgrammar, each of the subgrammars related to the grammar, wherein the first set of data structures is generated by the speech recognition system based at least in part on a grammar provided by a remote computer;
   acquiring a speech signal;
   performing a probabilistic search using the speech signal as an input, and using the first set of data structures as possible inputs; and
   allocating memory for one of the subgrammars when a transition to that subgrammar is made during the probabilistic search.

2. The method of claim 1 wherein the probabilistic search is a Viterbi beam search.

3. The method of claim 1 wherein the set of data structures is sent through a communication channel by a remote computer.

4. The method of claim 3 wherein the set of data structures is included in code that defines a web page.

5. The method of claim 3 wherein the set of data structures is associated with one or more web pages.

6. The method of claim 1 wherein the set of data structures is selected by a remote computer.

7. The method of claim 1 further comprising the step of acquiring a second set of data structures that contain a second grammar, a second word subgrammar, a second phone subgrammar, and a second state subgrammar, each of the second subgrammars related to the second grammar.

8. The method of claim 7 wherein the second set of data structures replaces the first set of data structures.

9. The method of claim 7 wherein the second set of data structures is acquired while the speech recognition system is operating.

10. In a speech recognition system, a method for recognizing speech comprising the steps of:
    acquiring a first set of data structures that contain a grammar, a word subgrammar, a phone subgrammar and a state subgrammar, each of the subgrammars related to the grammar, wherein the first set of data structures is generated by the speech recognition system based at least in part on a grammar provided by a remote computer;
    acquiring a speech signal;
    performing a probabilistic search using the speech signal as an input, and using the first set of data structures as possible inputs;
    allocating memory for one of the subgrammars when a transition to that subgrammar is made during the probabilistic search; and
    computing a probability of a match between the speech signal and an element of the subgrammar for which memory has been allocated.

11. The method of claim 10 wherein the probabilistic search is a Viterbi beam search.

12. The method of claim 10 further comprising the step of acquiring a second set of data structures that contain a second grammar, a second word subgrammar, a second phone subgrammar, and a second state subgrammar, each of the second subgrammars related to the second grammar.

13. The method of claim 12 wherein the second set of data structures replaces the first set of data structures.

14. The method of claim 12 wherein the second set of data structures is acquired while the speech recognition system is operating.

15. The method of claim 14 wherein the second set of data structures is included in code that defines a web page.

16. The method of claim 14 wherein the second set of data structures is associated with one or more web pages.

17. In a speech recognition system, a method for recognizing speech comprising the steps of:
    acquiring a first set of data structures that contain a top level grammar and a plurality subgrammars, each of the subgrammars hierarchically related to the grammar and to each other, wherein the first set of data structures is generated by the speech recognition system based at least in part on a grammar provided by a remote computer;

acquiring a speech signal;

performing a probabilistic search using the speech signal as an input, and using the first set of data structures as possible inputs;

allocating memory for specific subgrammars when transitions to those specific subgrammars are made during the probabilistic search; and computing probabilities of matches between the speech signal and elements of the subgrammars for which memory has been allocated.

18. The method of claim 17 wherein the top level grammar includes one or more word subgrammars, the word subgrammars including words that are related according to word-to-word transition probabilities.

19. The method of claim 18 wherein each word in a word subgrammar includes one or more phone subgrammars, the phone subgrammars including phones that are related according to phone-to-phone transition probabilities.

20. The method of claim 19 wherein each phone in a phone subgrammar includes one or more state subgrammars, the state subgrammars including states that are related according to state-to-state transition probabilities.

21. The method of claim 20 wherein the probabilities of matches between the speech signal and elements of the subgrammars for which memory has been allocated are computed using one or more probability distributions associated with each state.

22. The method of claim 20 wherein when a word is allocated in memory, an initial phone for the word and an initial state for the initial phone are also allocated in memory.

23. The method of claim 22 wherein one or more subsequent states are allocated in memory until the end of the phone is reached, the allocation based on a transition probability at each state.

24. The method of claim 23 wherein one or more subsequent phones are allocated in memory until the end of the word is reached, the allocation based on a transition probability at each phone.

25. The method of claim 20 wherein when a state probability falls below a state threshold, the state is deallocated from memory.

26. The method of claim 25 wherein the state threshold is dynamically adjustable.

27. The method of claim 21 wherein when a phone probability falls below a phone threshold, the phone is deallocated from memory.

28. The method of claim 27 wherein the phone threshold is dynamically adjustable.

29. The method of claim 20 wherein when a word probability falls below a word threshold, the word is deallocated from memory.

30. The method of claim 29 wherein the word threshold is dynamically adjustable.

31. The method of claim 25 wherein when all the states associated with a phone are deallocated from memory, the phone is deallocated from memory.

32. The method of claim 31 wherein when all the phones associated with a word are deallocated from memory, the word is deallocated from memory.

33. A method for allocating memory in a speech recognition system comprising the steps of:

acquiring a set of data structures that contain a grammar and one or more subgrammars related to the grammar, wherein the first set of data structures is generated by the speech recognition system based at least in part on a grammar provided by a remote computer;

acquiring a speech signal;

performing a probabilistic search using the speech signal as an input, and using the set of data structures as possible inputs; and allocating memory for a selected one or more of the subgrammars when a transition to the selected subgrammar is made during the probabilistic search.

34. In a speech recognition system, a method for recognizing speech comprising the steps of:

(a) acquiring a set of data structures that contain a grammar and one or more subgrammars related to the grammar, wherein the first set of data structures is generated by the speech recognition system based at least in part on a grammar provided by a remote computer:

(b) receiving spoken input;

(c) using one or more of the data structures to recognize the spoken input;

(d) while the speech recognition system is operating, acquiring a second set of data structures that contain a second grammar and one or more subgrammars related to the second grammar; and (e) repeating steps (b) and (c), using the second set of data structures in step (c).

35. In a speech recognition system, a method for recognizing speech comprising the steps of:

(a) acquiring from a first remote computer a set of data structures that contain a grammar and one or more subgrammars related to the grammar;

(b) receiving spoken input;

(c) using one or more of the data structures to recognize the spoken input;

(d) while the speech recognition system is operating, acquiring a second set of data structures from the first remote computer or from a second remote computer, the second set of data structures containing a second grammar and one or more subgrammars related to the second grammar; and (e) repeating steps (b) and (c), using the second set of data structures in step (c).

* * * * *

UNITED STATES PATENT AND TRADEMARK OFFICE
CERTIFICATE OF CORRECTION

| | | |
|---|---|---|
| PATENT NO. | : 7,324,945 B2 | Page 1 of 1 |
| APPLICATION NO. | : 09/894898 | |
| DATED | : January 29, 2008 | |
| INVENTOR(S) | : John W. Butzberger et al. | |

It is certified that error appears in the above-identified patent and that said Letters Patent is hereby corrected as shown below:

Title Page, Col. 2 item (56), (Other Publications), Line 4: Delete "J." and insert -- Y. --, therefor.

In the Specifications:

Col. 5, Line 11: Delete "required" and insert -- required. --, therefor.

In the Claims:

Col. 6, Line 42: In Claim 10, delete "subgrarnmar" and insert -- subgrammar --, therefor.

Col. 7, Line 49: In Claim 27, delete "claim 21" and insert -- claim 20 --, therefor.

Col. 8, Line 29: In Claim 34, delete "computer:" and insert -- computer; --, therefor.

Signed and Sealed this
Sixth Day of May, 2014

Michelle K. Lee
*Deputy Director of the United States Patent and Trademark Office*